United States Patent [19]

Fitch

[11] 3,906,479
[45] Sept. 16, 1975

[54] TIME INTERVAL COMPUTER
[75] Inventor: Troy W. Fitch, Greenville, Tex.
[73] Assignee: E-Systems, Inc., Dallas, Tex.
[22] Filed: Mar. 15, 1974
[21] Appl. No.: 451,430

[52] U.S. Cl............................ 340/309.1; 340/309.4
[51] Int. Cl.² .......................................... G08B 5/38
[58] Field of Search................. 340/309.1; 307/117; 324/94, 30, 68

[56] References Cited
UNITED STATES PATENTS
3,355,731  11/1967  Jones .............................. 340/309.1
3,697,982  10/1972  Kawaki........................... 340/384 E

*Primary Examiner*—Harold I. Pitts
*Attorney, Agent, or Firm*—Robert V. Wilder

[57] ABSTRACT

Precision test equipment requires periodic maintenance and calibration to insure accurate and reliable operation. For the most efficient use of such test equipment, it is serviced on the basis of time in operation and not on a calendar interval. To monitor the time in usage of test equipment and signal the expiration of an operating time interval, a computer is connected to the equipment and operated only when the test equipment itself is operational. This time interval computer utilizes as a timing element an electrochemical storage cell which has a pair of electrodes and contains active material for transfer between the pair of electrodes. The electrochemical storage cells control a four stage transistor switch that includes an output stage transistor controlling a warning light circuit. At the end of a selected time interval, as determined by a resistor in series with the storage cell, an oscillator takes over control of the output stage transistor to provide a flashing operation of the warning light.

12 Claims, 3 Drawing Figures

TIME INTERVAL COMPUTER

BACKGROUND OF THE INVENTION

This invention relates to a time interval computer, and more particularly to a timer that provides an alert of events on a time usage basis rather than on a calender interval basis.

During a statistical analysis of data taken over a period of years concerning precision measurement and test equipment calibration intervals, it was discovered that equipment calibrated by time usage rather than calender interval constitutes a large savings inasmuch as 100% of each calibration is realized by a user. From this statistical analysis, it has been estimated that only 50% of all equipment calibrated under a periodic calibration interval reaches a midpoint of its calibration cycle hours prior to the next periodic interval. The data revealed that few, if any, items reached the maximum allowed hours of usage in a calibration cycle and that only those items requiring long periods of warmup to stabilize (frequency counters, high frequency generators, pyrometric bridges) reach the midpoint prior to expiration of the calendar calibration cycle. Many items were found that were not used at all; however, without a means for accurately accumulating time of usage, identification of such equipment is impossible.

It has long been realized that most electronic equipment deteriorates in accuracy and reliability in a direct relation with the time of usage. Such equipment may only be used for short time intervals on an irregular schedule thereby making it most difficult to maintain an accurate log of accumulated time in operation. Many hand recording techniques have been utilized in the past such that an operator manually enters into a log the elapsed time he has used a particular piece of equipment or the equipment is tagged with a recalibration date. All too often, however, there has been a failure to enter a particular usage and a subsequent user is uncertain as to the present accuracy of the equipment. This oftens results in unnecessary recalibration and maintanance to insure a required degree of accuracy. With the recalibration date tag technique, a user may overlook the calibration due data and consequently use out of date equipment.

It is also well known that many complicated machines require periodic disassembly and rebuilding to insure reliable operation. For example, aircraft engines are operated on a time basis and rebuilt after a given number of hours in operation. Heretofore, the elapsed time of usage of such equipment has been monitored by an elasped time clock. These clocks require the use of mechanical digital readouts that consume excessive amounts of power in operation.

It has also been recognized that for the most efficient operation of a motor vehicle, periodic service is essential. Again, the service interval is based on time of usage rather than a calendar interval.

SUMMARY OF THE INVENTION

A feature of the present invention is to provide an indication of the expiration of an event on a time basis. An electrochemical storage cell is actuated each time a piece of equipment is put into operation. The storage cell responds to an energizing voltage and changes from one state of conduction to another on the basis of time energized. Thus, the electrochemical storage cell effectively maintains a continuous accumulation of time in operation of a piece of equipment through which it is energized.

Another feature of the present invention is to provide a time interval computer utilizing an electrochemical storage cell to monitor the elapsed time of usage for purposes of maintenance inspection, calibration, lubrication or to collect operating history such as mean time between failure and rental fees. The circuit of the time interval computer utilizes solid state components for reliable and inexpensive operation. At the end of an established time interval a warning is given through an alarm circuit.

In accordance with one embodiment of the invention, an electrochemical storage element controlled timing circuit includes a multiple stage transistor switch having an output transistor and an input transistor, the latter controlled by operation of the element to provide a base drive signal to the output transistor. An oscillator provides a periodically occurring base drive signal also to the base electrode of the output transistor to control the conduction thereof along with the base drive signal of the input transistor. Connected to the output transistor is an alarm that is periodically actuated in accordance with the conduction cycle of the output transistor.

BRIEF DESCRIPTION OF THE DRAWINGS

A more complete understanding of the invention and its advantages will be apparent by reference to the following description taken in connection with the accompanying drawings.

Referring to the drawings.

DESCRIPTION OF THE PREFERRED EMBODIMENT

Figure 1:
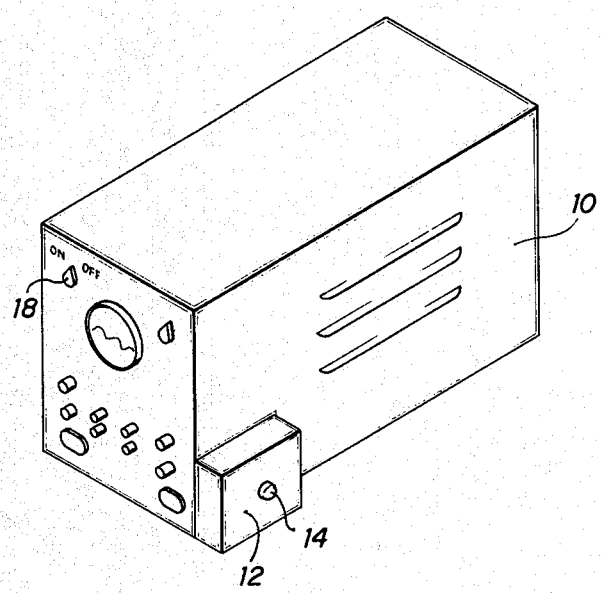
FIG. 1 is a pictorial illustrating a typical piece of electronic equipment with a time interval computer of the present invention connected thereto.

Referring to FIG. 1, electronic equipment, such as the oscilloscope 10, requires periodic calibration to insure accurate operation when functioning for its designed purpose. Such equipment, however, is not continuously in use and the calibration interval is based on usage rather than a calender interval. An operator using the oscilloscope 10 relies on the instrument's accuracy to present a pictorial representation of the operation of a system connected to input terminals on the instrument's front plate.

To monitor the time of usage of the oscilloscope 10, a time interval computer 12 is mounted to the cabinet side wall. The time interval computer includes a warning light 14 that is normally on during operation of the oscilloscope 10 and illuminated continuously. This gives an indication to the operator that his equipment is operational and connected to a power source. Alternately, the time interval computer 12 may be assembled within the cabinet of the oscilloscope 10 and the warning light 14 may be the existing pilot light on the equipment.

Figure 2:
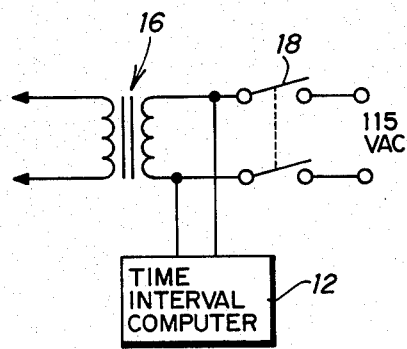
FIG. 2 is an electrical schematic of an input circuit for the equipment of FIG. 1 showing the connection of a time interval computer to the input line.

Referring to FIG. 2, the time interval computer 12 is connected to a power source 16 of the oscilloscope 10 immediately downstream of a power switch 18 comprising the normal on-off switch of the oscilloscope. Thus, the time interval computer 12 is always energized when the oscilloscope 10 is connected to a power source.

Figure 3:
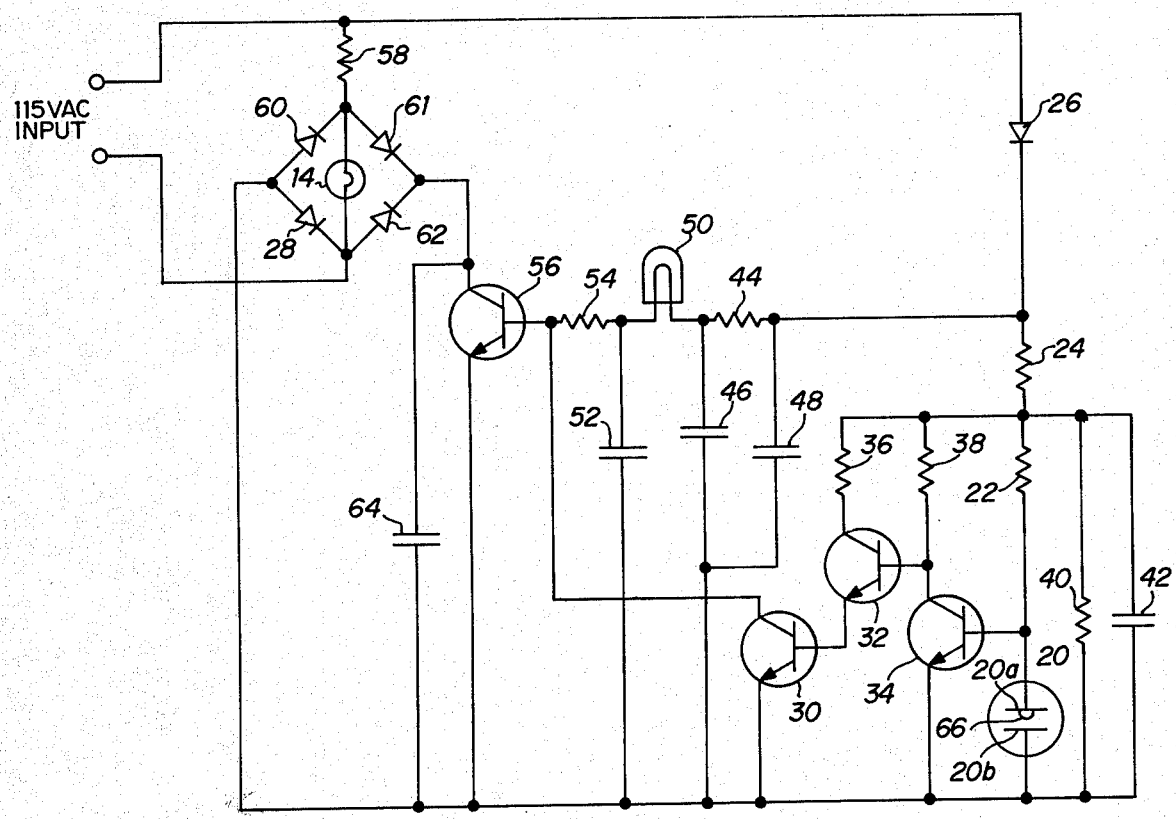
FIG. 3 is a schematic circuit diagram of a time interval computer utilizing an electrochemical storage cell for establishing an operating time interval.

Referring to FIG. 3 showing a schematic of the time interval computer 12, at the end of an established time interval of usage the warning light 14 changes from a condition of continuous illumination to a flashing condition. This change in mode of operation of the warning light 14 is controlled by an electrochemical storage cell 20. The electrochemical storage cell 20 provides an integration of the information supplied to the cell about the operation of the oscilloscope 10. The storage cell 20 has a pair of electrodes and includes active material that is transferred between the electrodes in accordance with the elapsed time the computer 12 is connected to a supply source. Specifically, an initial charge of active material is included on one of the electrodes and as the oscilloscope 10 is operated, this material is transferred from one electrode to the other electrode. When all the active material has been transferred from one of the electrodes, the resistance across the electrodes in the storage cell increases and this increase in resistance is used to control the application of an energizing voltage to the warning light 14 thereby providing an output indication to the operator of the oscilloscope 10.

A more complete description of an electrochemical storage cell and its operation may be had by referring to Bulletin 500 of Plessey, Incorporated, 3,860 Centinela Ave., Los Angeles, Calif. 90066.

The cell 20 is connected to the energizing source for the oscilloscope 10 through a timing resistor 22 in series with a bias resistor 24 and a diode 26. The diode 26, resistor 24 and resistor 22 interconnect one electrode of the cell 20 to one terminal of the switch 18. The other electrode of the cell 20 is connected to the second terminal of the switch 18 through a diode 28 as part of a bridge network providing an energizing voltage to the warning light 14.

Connected to the junction of the resistors 22 and 24 is a switching network comprising transistors 30, 32 and 34. The transistors 30 and 34 are coupled in an emitter follower configuration with the collector of the transistor 32 biased through a resistor 36 as connected to the junction of the resistors 22 and 24. The transistor 34 drives the transistor 32 through a base electrode connection and is biased by means of a resistor 38 in parallel with the resistor 36. Connected to the base electrode of the transistor 34 is one electrode of the cell 20.

In parallel with the cell 20 and the timing resistor 22 is an RC network including a resistor 40 and a capacitor 42.

Connected to the junction of the diode 26 and the resistor 24 is an oscillator including a timing network of a resistor 44 in series with a capacitor 46. In parallel with the resistor and capacitor timing network is a capacitor 48. This capacitor is used to stabilize the voltage at the junction of the diode 26 and the resistor 24 for fluxuations in input line voltage.

A voltage build-up across the capacitor 46 after increasing to a threshold level is discharged through a neon tube 50 and a capacitor 52. The threshold level is established by the characteristics of the neon tube 50. This discharge of the capacitor 46 establishes a voltage at one terminal of a resistor 54 having a second terminal connected to the base electrode of an output switch transistor 56 as part of the switching network.

Also connected to the base electrode of the output switch transistor 56 is the collector electrode of the transistor 30 of the switching network controlled by the cell 20. Thus, both the oscillator circuit and the switching network control the output switch transistor 56.

An AC power source connected to the time interval computer 12 is applied to the warning light 14 through a dropping resistor 58. The warning light 14 is connected across an actuating bridge network including the diode 28 and the diodes 60–62. The cathode electrodes of the diodes 61 and 62 are interconnected to the collector electrode of the output switch transistor 56 and the anode electrodes of the diodes 28 and 60 are interconnected to the cell 20. Also connected to the collector electrode of the output switch transistor 56 is a capacitor 64.

In operation of the time interval computer, AC power applied to the network energizes the warning light 14 for continuous illumination. At the same time, a voltage is applied through the diode 26 and the resistor 24 to the switching network thereby turning on transistors 30 and 32. With the transistor 30 in the conduction state, the output switch transistor 56 is nonconducting and the diode bridge is enabled to cause illumination of the warning light 14. At the same time, the oscillator, including the resistor 44 and capacitor 46, is operating to provide an oscillating voltage across the resistor 54. However, the oscillator is ineffective to control the output switch transistor 56 by the override control of the transistor 30.

A voltage applied to the switching network is also applied through the timing resistor 22 to the electrochemical storage cell 20. The cell 20 includes a pair of electrodes 20a and 20b and active material, such as identified by the reference number 66, is plated on the electrode 20a. The active material 66 is transferred from the electrode 20a to the electrode 20b at a rate in accordance with the voltage applied across the cell 20 as determined by the timing resistor 22. The greater the voltage potential across the cell 20, the shorter the time interval before all the active material 66 is transferred to the electrode 20b. Thus, the greater the value of the timing resistor 22 the lower the voltage across the cell 20 and the longer the plating time.

After all the active material is transferred from the electrode 20a to the electrode 20b, the resistance across the cell increases and this increase in resistance provides a base drive voltage to control the transistor 34. Typically, the unplated impedance of the cell 20 is 250 ohms and the plated impedance is between 50 M and 80 M ohms.

After the transfer of the active material 66 from the electrode 20a to the electrode 20b, the transistor 34 turns on thereby turning off the transistors 30 and 32. This releases the transistor 56 from the control of the switching network and transfers such control to the oscillator through the resistor 54. The output switch resistor 56 is now controlled by the oscillating voltage developed across the resistor 54 as the capacitor 46 is charged through the resistor 44 and discharged through the neon tube 50 and the capacitor 52. As the output switch transistor 56 is turned on and off by operation of the oscillator, the warning light 14 changes into a flashing mode of illumination as the bridge network is disabled when the transistor 56 turns on. The warning light 14 continues to flash so long as the computer 12 is connected to the supply source and the transistor 34 is turned on. This flashing of the warning light 14 indicates to an operator that the equipment is in need of servicing.

To rearm the time interval computer 12, the electrochemical storage cell 30 is removed from the circuit and recharged such that the active material 66 is again deposited on the electrode 20a. It is then reinserted into the circuit and the operation, as described, resumes.

Referring to Table 1, there is listed component values for the resistors and capacitors of one embodiment of the circuit of FIG. 3. Also listed are identifying codes for the transistors, diodes, the warning light 14, and the neon tube 50.

TABLE 1

| | | |
|---|---|---|
| CAPACITOR | 64 | .01 MF, 500WV |
| | 52 | .01 MF, 500 WV |
| | 46 | 5 MF, 200 WV |
| | 42 | 4.7 MF, 10 WV |
| | 48 | 8 MF, 150 WV |
| DIODE | 28 | 1N4004 |
| | 60 | 1N4004 |
| | 61 | 1N4004 |
| | 62 | 1N4004 |
| | 26 | 1N4004 |
| WARNING LIGHT | 14 | NL-S1 |
| NEON TUBE | 50 | NE-2 |
| TRANSISTOR | 30 | 2N2924 |
| | 32 | 2N2924 |
| | 34 | 2N2924 |
| | 56 | 2N3440 |
| RESISTOR | 58 | 15K |
| | 54 | 100 Ω |
| | 44 | 1.5 M |
| | 36 | 10 K |
| | 38 | 270 K |
| | 22 | 6.8 M |
| | 40 | 20 K |
| | 24 | 470 K |

While only one embodiment of the invention, together with modifications thereof, has been described in detail herein and shown in the accompanying drawings, it will be evident that various further modifications are possible without departing from the scope of the invention.

What is claimed is:

1. A timing circuit for use with an electrochemical storage element, said timing circuit comprising:
    an oscillator providing a periodically occurring drive signal;
    an output transistor connected to said oscillator;
    an enable switching means connected to said output transistor, said enable switching means being controlled by the operation of the storage element, the storage element being operable after a predetermined cumulative period of recurrent energization for exhibiting a change in an electrical characteristic thereof, said enable switching means being responsive to said change for enabling conduction of said output transistor in accordance with said periodically occurring drive signal; and
    alarm means connected to said output transistor and periodically actuated in accordance with the conduction cycle of the output transistor.

2. A timing circuit as set forth in claim 1 wherein said oscillator comprises:
    a timing network generating a time varying voltage at an output terminal; and
    a diode connected to the output terminal and triggered by the time varying voltage at a threshold level to conduct a base drive signal to the base electrode of the output transistor.

3. A timing circuit as set forth in claim 2 wherein said oscillator further includes a capacitor connected to said diode at the base electrode of the output transistor to reduce the time varying voltage below the threshold level of said diode.

4. A timing circuit as set forth in claim 3 wherein said timing network includes a series connection of a resistor and a capacitor with said diode connected to the junction therebetween.

5. A timing circuit for use with an electrochemical storage element, said timing circuit comprising;
    an oscillator providing a periodically occurring base signal;
    an output transistor connected to said oscillator;
    an enable switching means connected to said output transistor, said enable switching means being controlled by the operation of the storage element, the storage element being operable after a predetermined cumulative period of recurrent energization for exhibiting a change in an electrical characteristic thereof, said enable switching means being responsive to said change for enabling conduction of said output transistor in accordance with said periodically occurring drive signal;
    a diode bridge connected to the output transistor and periodically actuated in accordance with the conduction cycle of the output transistor; and
    an indicator lamp connected across said bridge to be energized by the actuation thereof.

6. A timing circuit as set forth in claim 5 including a compensating network connected to said oscillator to compensate for fluctuations in a live voltage applied to the circuit.

7. A timing circuit as set forth in claim 5 wherein said indicator lamp as connected across said bridge is supplied from a voltage source and conduction of the output transistor disables said bridge to turn off the indicator lamp.

8. A timing circuit for use with an electrochemical storage element, said timing circuit comprising:
    an output transistor;
    a timing network generating a time varying voltage at an output terminal;
    a diode connected to the output terminal and triggered by the time varying voltage at a threshold level to provide a periodically occurring drive signal to the base electrode of the output transistor;
    an enable switching means connected to said output transistor, said enable switching means being controlled by the operation of the storage element, the storage element being operable after a predetermined cumulative period of recurrent energization for exhibiting a change in an electrical characteristic thereof, said enable switching means being responsive to said change for enabling conduction of said output transistor in accordance with said periodically occuring drive signal;
    a diode bridge connected to the output transistor and periodically actuated in accordance with the conduction cycle of the output transistor; and an indicator lamp connected across said bridge to be energized by the actuation thereof.

9. A timing circuit as set forth in claim 8 including a capacitor connected to said diode at the base electrode side to reduce the time varying voltage to below the threshold level of the diode.

10. A timing circuit as set forth in claim 8 wherein said timing network includes a series connection of a resistor and a capacitor with the interconnection therebetween connected to said diode.

11. A timing circuit as set forth in claim 8 including a compensating network connected to said timing network to compensate for fluctuations in a line voltage applied to the circuit.

12. A timing circuit for use with an electrochemical storage element, said timing circuit comprising;
input terminal means arranged for selective connection to a source of AC voltage;
a diode bridge having AC and DC terminals, said AC terminals being connected to said input terminal means;
indicator means connected across said AC terminals of said diode bridge;
an output transistor connected across said DC terminals of said diode bridge, said indicator means being operable to provide a constant indication when said output transistor is non-conductive and an AC voltage appears across said input terminal means;
a control circuit for controlling the operation of said output transistor;
means connected to said input terminal means for deriving a DC control voltage from the AC voltage appearing at said input terminal means for application to said control circuit, said control circuit including:
timing network generating a time varying voltage at an output terminal;
a diode connected to the output terminal and triggered by the time varying voltage at a threshold level to provide a periodically occurring drive signal to the base electrode of the output transistor;
a capacitor connected to said diode at the base electrode side to reduce the time varying voltage to below the threshold level of the diode, said timing network including a series connection of a resistor and a capacitor with the interconnection therebetween connected to said diode;
an enable switching means connected to said output transistor, said enable switching means being controlled by the operation of the storage element, the storage element being operable after a predetermined cumulative period of recurrent energization by the DC control voltage for exhibiting a change in an electrical characteristic thereof, said enable switching means being responsive to said change for enabling conduction of said output transistor in accordance with said periodically occurring drive signal; and
a compensating network connected to said timing network to compensate for fluctuations in said DC control voltage.

* * * * *